(12) United States Patent
Azim et al.

(10) Patent No.: US 6,952,789 B1
(45) Date of Patent: Oct. 4, 2005

(54) SYSTEM AND METHOD FOR SYNCHRONIZING A SELECTED MASTER CIRCUIT WITH A SLAVE CIRCUIT BY RECEIVING AND FORWARDING A CONTROL SIGNAL BETWEEN THE CIRCUITS AND OPERATING THE CIRCUITS BASED ON THEIR RECEIVED CONTROL SIGNAL

(75) Inventors: Syed K. Azim, Fremont, CA (US); Venkat Yadavalli, Milpitas, CA (US); Keven B. Hui, Union City, CA (US)

(73) Assignee: LSI Logic Corporation, Milpitas, CA (US)

( * ) Notice: Subject to any disclaimer, the term of this patent is extended or adjusted under 35 U.S.C. 154(b) by 649 days.

(21) Appl. No.: 09/951,939

(22) Filed: Sep. 12, 2001

Related U.S. Application Data

(60) Provisional application No. 60/290,551, filed on May 11, 2001.

(51) Int. Cl.[7] ............................................. G06F 13/42
(52) U.S. Cl. ...................................................... 713/400
(58) Field of Search .......................... 713/400; 710/61

(56) References Cited

U.S. PATENT DOCUMENTS

| | | | |
|---|---|---|---|
| 4,310,896 A * | 1/1982 | Cutler et al. ................. | 710/105 |
| 4,509,113 A * | 4/1985 | Heath ........................... | 710/66 |
| 5,367,697 A * | 11/1994 | Barlow et al. ............... | 713/330 |
| 5,564,114 A * | 10/1996 | Popat et al. ................. | 710/105 |
| 6,516,420 B1 * | 2/2003 | Audityan et al. ........... | 713/400 |

FOREIGN PATENT DOCUMENTS

JP 58064528 A * 4/1983 ............. G06F 3/00

OTHER PUBLICATIONS

Software Reset to Second Processor Via Non-Maskable Interrupt, Jul. 1989, IBM Technical Disclosure Bulletin, vol. 32, Issue 2, pp. 86-87.*

* cited by examiner

*Primary Examiner*—Mark Connolly
(74) *Attorney, Agent, or Firm*—Thelen Reid & Priest, LLP

(57) ABSTRACT

A mechanism for synchronizing a multiple-circuit system, includes (a) selecting a master circuit from a plurality of circuits, the remaining circuits including at least one slave circuit, (b) receiving, at each of the plurality of circuits, input data and a local clock signal associated with the input data, (d) generating at least one control signal at the master circuit using the local clock signal of the master circuit, (e) outputting the control signal from the master circuit, (f) forwarding the control signal to the slave circuit(s), (g) looping back the control signal to the master circuit, (h) processing the input data at the slave circuit(s) using the forwarded control signal, (i) processing the input data at the master circuit using the looped-back control signal, and (j) outputting the processed data from each of the plurality of circuits.

50 Claims, 8 Drawing Sheets

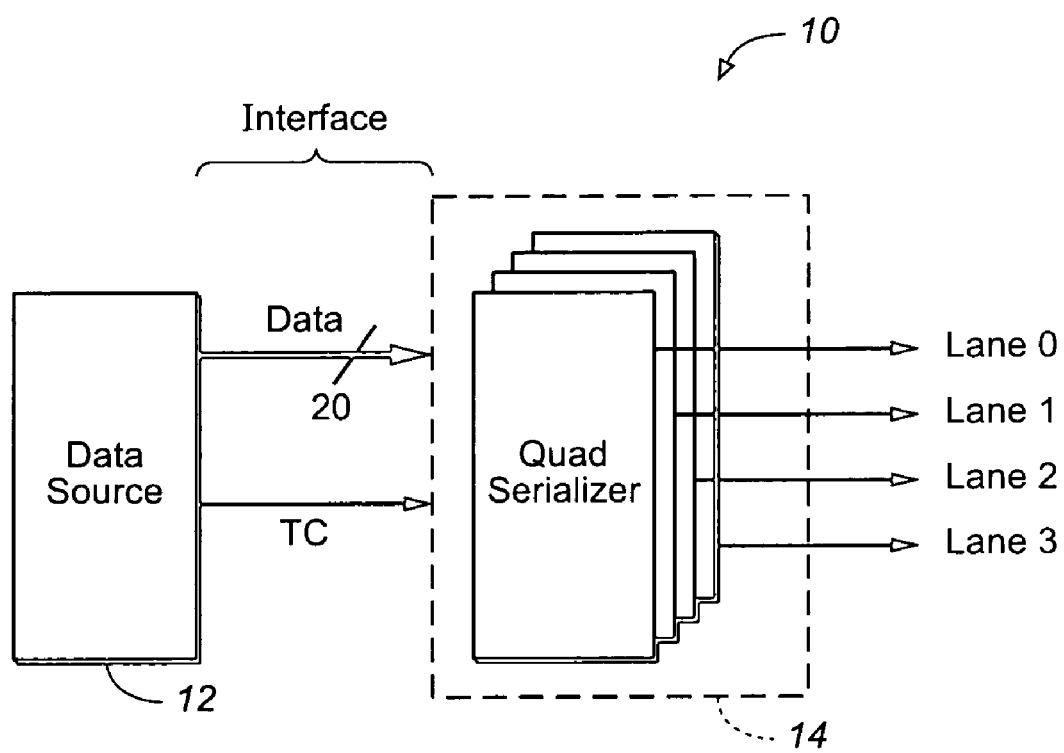
FIG._1

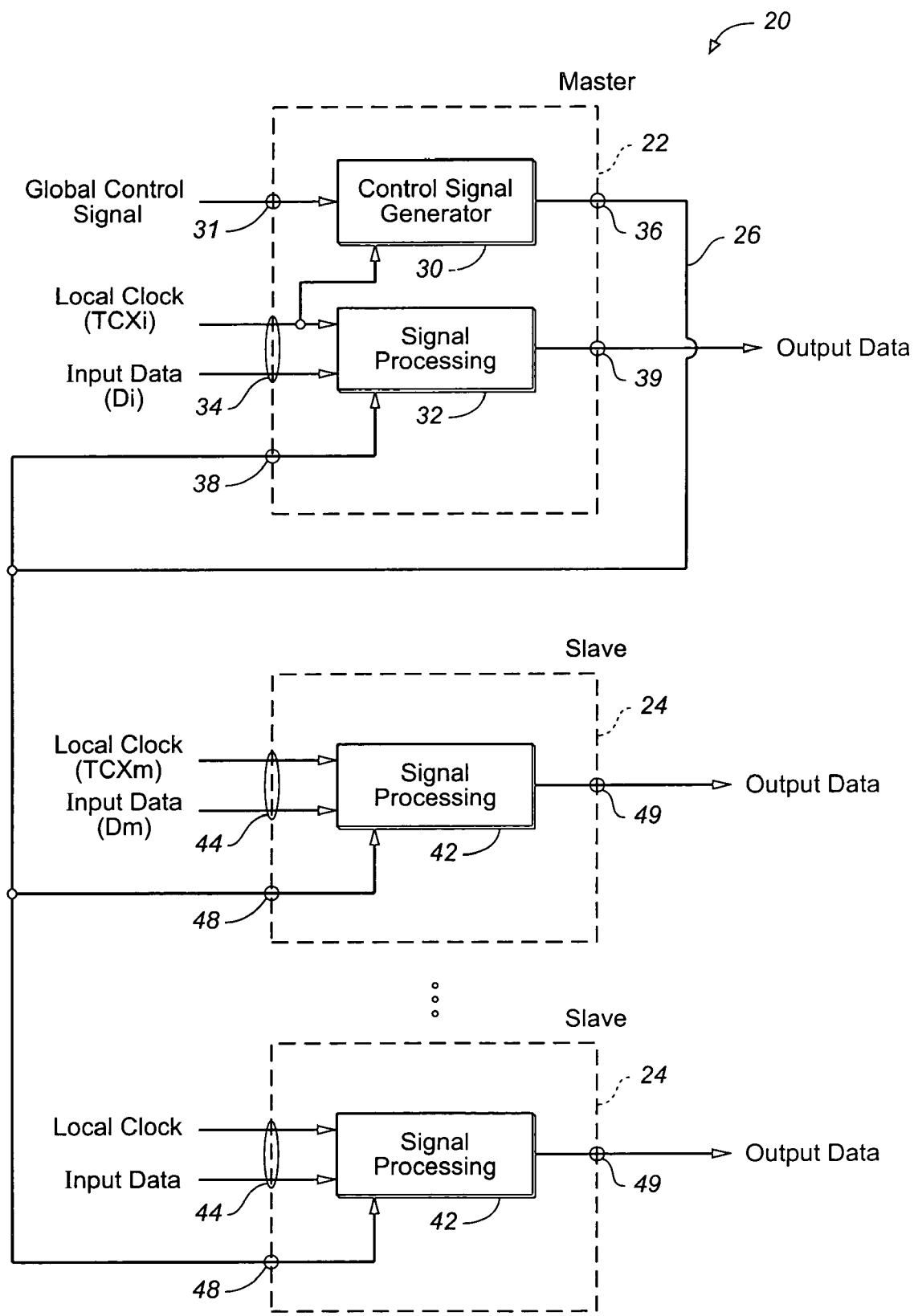
FIG._2

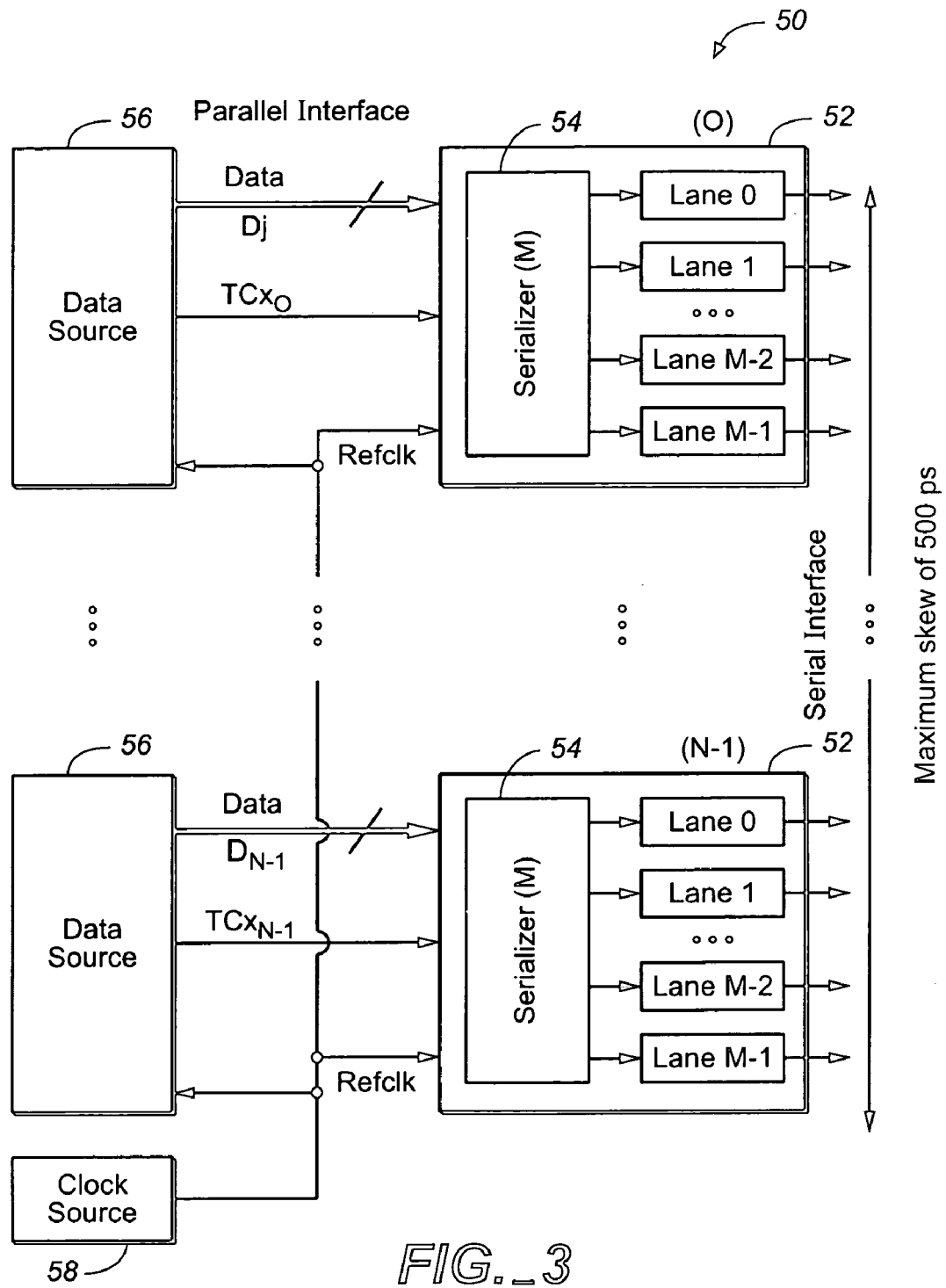
FIG._3

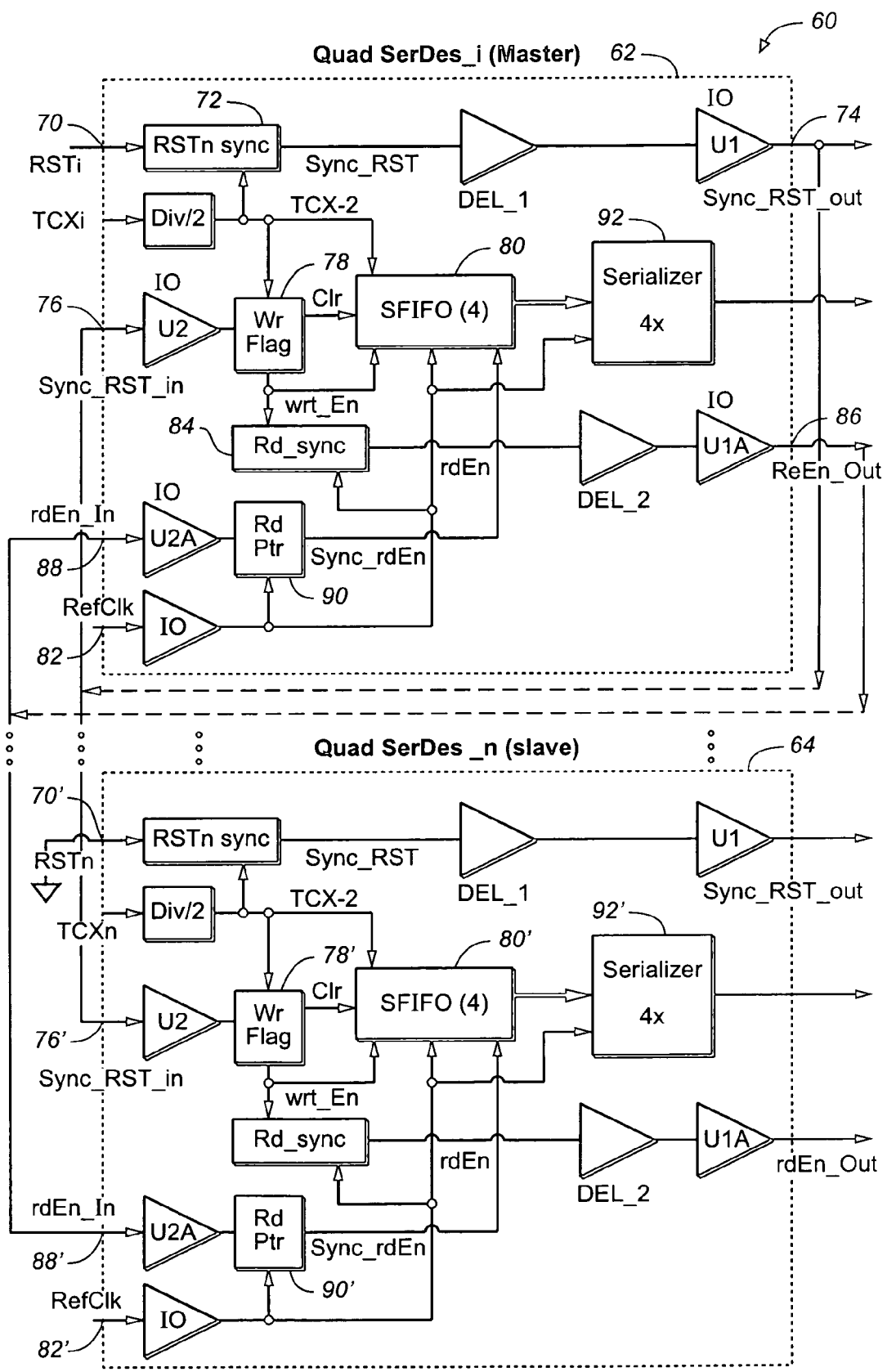
FIG._4

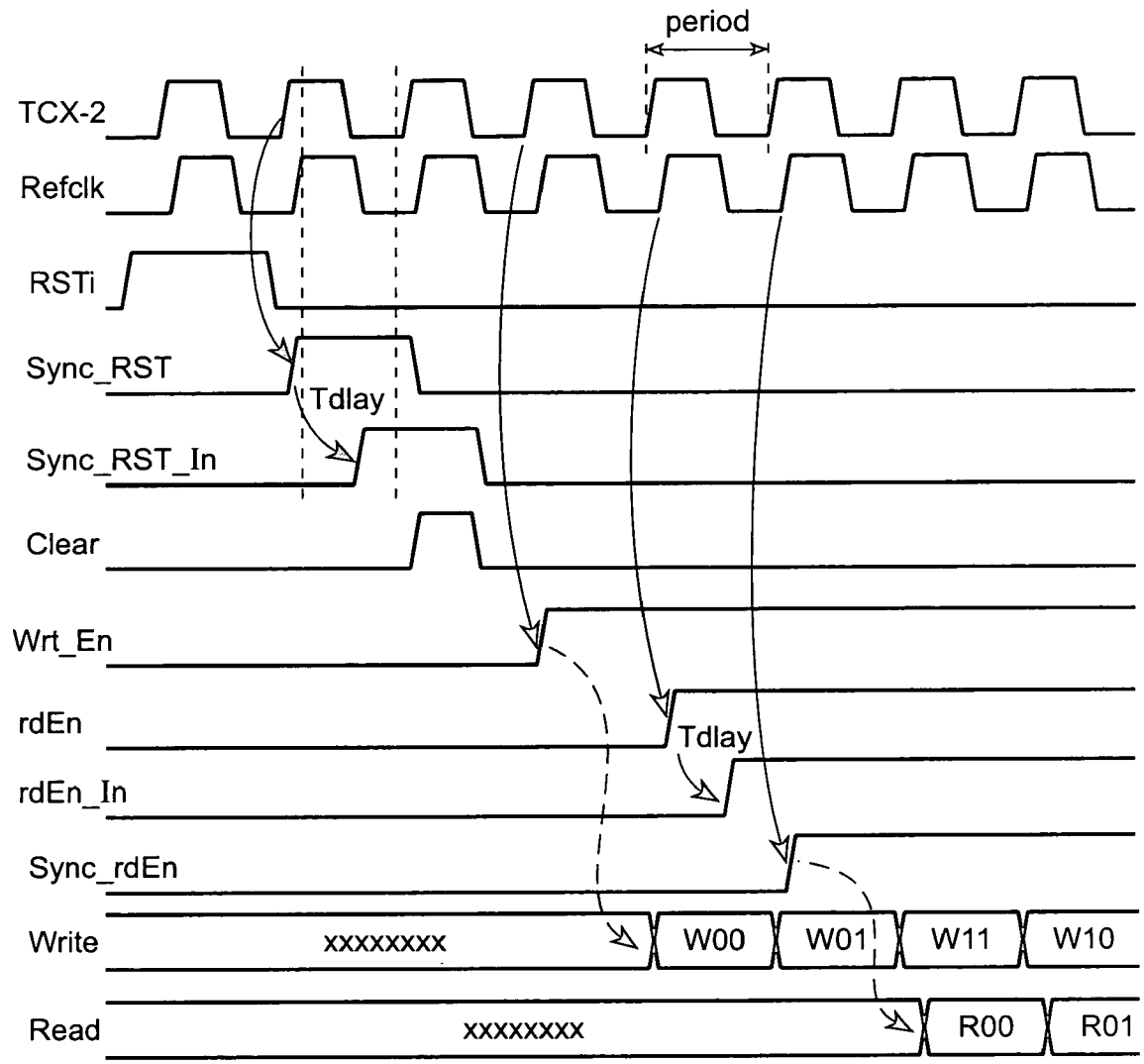
FIG._5

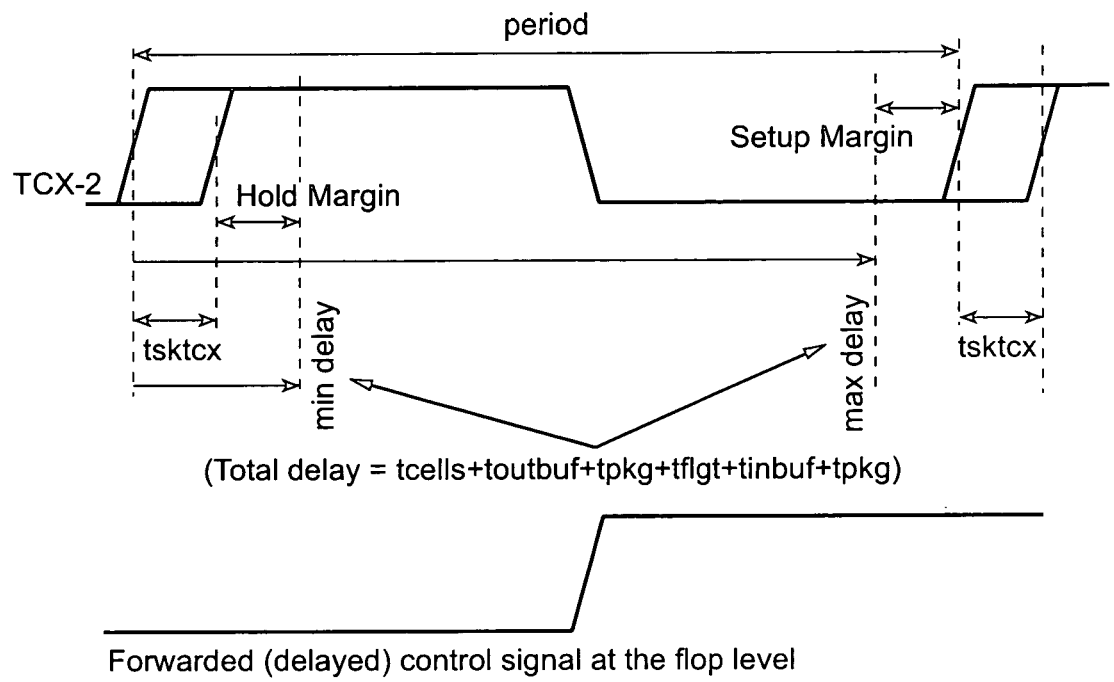

Forwarded (delayed) control signal at the flop level

FIG._6

| Parameter Description | Max | Unit |
|---|---|---|
| Total timing budget | 500 | ps |
| Refclk skew between all SerDes chips at the input pins level | 50 | ps |
| Refclk skew between all SerDes chips including all internal cells and routing at the GigaBlaze Core input ports level across PVT | 75 | ps |
| Mismatch in PLL phase error across all chips and PVT | 50 | ps |
| PVT variations of insertion delay of all internal cells including serializers and serial interface output buffers across all chips | 225 | ps |
| Package skew | 50 | ps |
| Total skew | 450 | ps |
| Margin | 50 | ps |

FIG._7

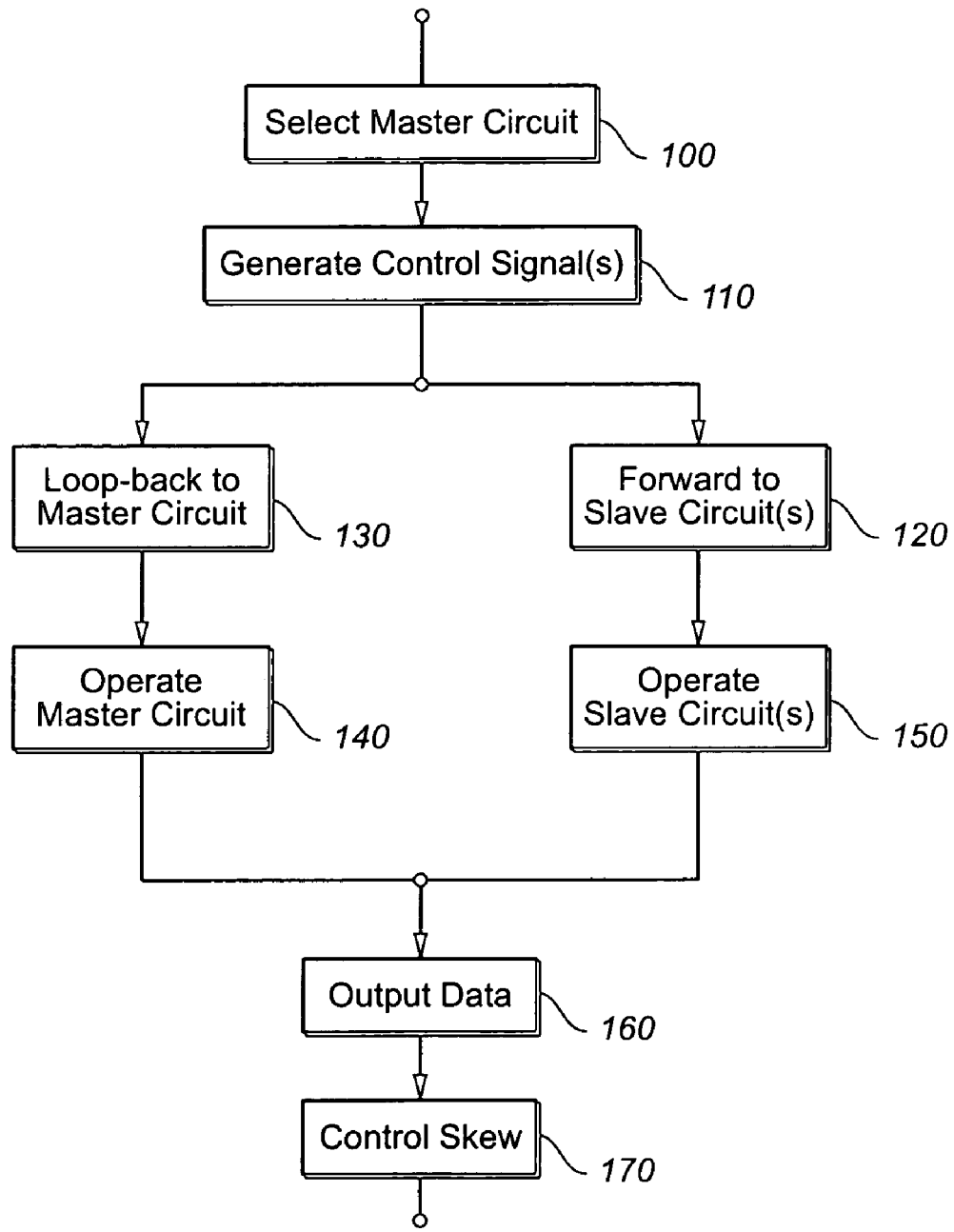
FIG._8

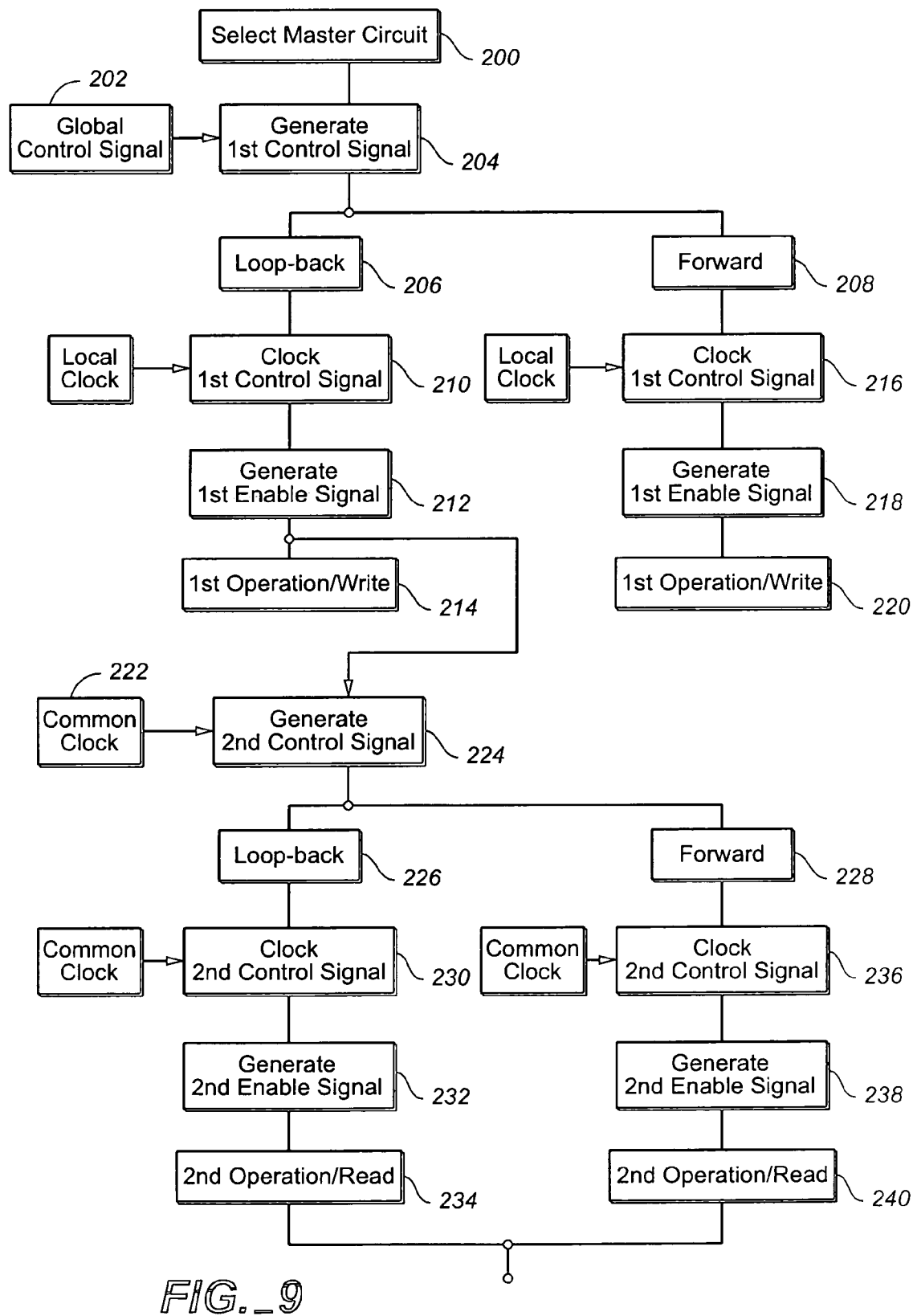
FIG._9

SYSTEM AND METHOD FOR SYNCHRONIZING A SELECTED MASTER CIRCUIT WITH A SLAVE CIRCUIT BY RECEIVING AND FORWARDING A CONTROL SIGNAL BETWEEN THE CIRCUITS AND OPERATING THE CIRCUITS BASED ON THEIR RECEIVED CONTROL SIGNAL

RELATED APPLICATIONS

This application claims the benefit of U.S. Provisional Patent Application Ser. No. 60/290,551 filed on May 11, 2001 in the names of Khalid Azim, Venkat Yadavalli and Keven Hui.

FIELD OF THE INVENTION

The present invention relates to operation of a multiple-circuit system. More particularly, the present invention relates to synchronization of a multiple-circuit system and controlling data skew among the multiple circuits.

BACKGROUND OF THE INVENTION

FIG. 1 illustrates a data transmitting portion of a serial input/output (I/O) circuit 10. In source synchronous interfaces, a clock signal (TC) is transmitted along with a group of parallel data from a data source 12. This clock signal is used to latch the group of data in a circuit 14 that receives the data. The receiving circuit 14 typically includes a serializer, for example, such as a quad serializer receiving 20-bit parallel data. A quad serializer performs parallel-to-serial conversion and outputs the serial data to four serial data lane links, as shown in FIG. 1. The receiving circuit 14 which references to the clock signal forwarded with a specific group of data is typically implemented in a single circuitry unit or chip.

As the bus width become wider to achieve faster data rate, more data link connections are required. For example, in channel-based point-to-point connections such as an Infiniband application, a word is encoded and sent out through up to 12 different channels/lanes, and thus it is required to provide a 12-lane high speed serial link (current chip implementations handle up to 4 lanes which provides up to 4×3.125 Gigabits/sec for Ethernet). In order to provide such a multiple data lane connection, a plurality of I/O circuits, typically transceivers, should be ganged together.

The specification of multi-link connections typically includes requirements for acceptable skew at the serial data outputs across multiple I/O circuits. For example, in the Infinivand application described above, the delay skew across all 12 lanes at the serial outputs has to be 500 picosecond (ps) or less according to the current electrical specification. During the serialization, the I/O circuits are also required to align all incoming parallel data to within the same byte/cycle.

However, when two or more I/O circuits or chips which are referencing to different forwarded clocks are bundled, the data coming out of the different circuits/chips are not necessarily in sync. Due to the timing skew caused by a number of variations including process, temperatures, voltages, and board traces skew, synchronization of these output data across the multiple circuits/chips becomes a difficult task. Such a multiple-circuit system using different local clocks also puts a significant limitation on chips placement and board routing in order to minimize the skew across all different clocks. Thus, ganging a plurality of I/O circuit/chips without any special circuit techniques will result in large and out-of-spec data skews between different circuits, making the system unusable.

Accordingly, it would be desirable to provide a scheme for synchronizing a multiple-circuit system such as a system including a plurality of I/O circuitry units, and for controlling data skew across multiple circuits.

BRIEF DESCRIPTION OF THE INVENTION

A mechanism for synchronizing a multiple-circuit system, includes (a) selecting a master circuit from a plurality of circuits, the remaining circuits including at least one slave circuit, (b) receiving, at each of the plurality of circuits, input data and a local clock signal associated with the input data, (d) generating at least one control signal at the master circuit using the local clock signal of the master circuit, (e) outputting the control signal from the master circuit, (f) forwarding the control signal to the slave circuit(s), (g) looping back the control signal to the master circuit, (h) processing the input data at the slave circuit(s) using the forwarded control signal, (i) processing the input data at the master circuit using the looped-back control signal, and (j) outputting the processed data from each of the plurality of circuits.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a block diagram schematically illustrating a data transmitting portion of a serial input/output (I/O) circuit.

FIG. 2 is a block diagram schematically illustrating a multiple-circuit system in accordance with an embodiment of the present invention.

FIG. 3 is a block diagram schematically illustrating a multiple-circuit system in accordance with an embodiment of the present invention, where the signal processing in each circuit involves a parallel-serial conversion.

FIG. 4 is a block diagram schematically illustrating the detailed structure of a multiple-circuit system in accordance with a specific embodiment of the present invention.

FIG. 5 is a timing diagram illustrating timing and logic waveforms of the synchronization scheme in accordance with an embodiment of the present invention.

FIG. 6 is a timing diagram illustrating an example of calculating timing budget and margin for the forwarded control signals.

FIG. 7 is a table showing break-down parameters contributing skew in a specific example of a serializer-deserializer (SerDes) chip implementation.

FIG. 8 is a process flow diagram illustrating a method for synchronizing a multiple-circuit system in accordance with an embodiment of the present invention.

FIG. 9 is a process flow diagram illustrating a method for synchronizing a multiple-circuit system in accordance with an embodiment of the present invention.

DETAILED DESCRIPTION

Embodiments of the present invention are described herein in the context of a method and apparatus for synchronizing a multi-circuit system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 2 schematically illustrates a multiple-circuit system 20 in accordance with an embodiment of the present invention. As shown in FIG. 2, the multiple-circuit system 20 includes a master circuit 22 and at least one slave circuit 24. The master circuit 22 includes a control signal generator 30, a signal processing portion 32, a synchronous input port 34, a control signal output port 36, and a control signal input port 38. Input data (Di) and a local clock signal (TCXi) associated with the input data sent from a data source (not shown) are received at the synchronous input port 34 and input to the signal processing portion 32. The local clock signal is also input to the control signal generator 30. The control signal generator 30 generates at least one control signal using the local clock signal (TCXi).

Each slave circuit 24 includes a signal processing portion 42, a synchronous input port 44, and a control signal input port 48. Input data (Dm) and a local clock signal (TCXm) associate with the input data sent from a data source (not shown) are received at the synchronous input port 44 and input to the signal processing portion 42.

The control signal generated in the master circuit 22 is output via the control signal output port 46 onto a control signal bus 26. The control signal bus 26 is coupled from the control signal output port 36 of the master circuit 22 to the control signal input port 48 of each slave circuit 24, and to the control signal input port 38 of the master circuit 22.

The output control signal is supplied to each slave circuit 24 and received at the control signal input port 48. The signal processing portion 42 of the each slave circuit 24 processes the input data (Dm) in accordance with the control signal. The processed data is output via at least one output port 49 of the slave circuit 24.

The control signal is also looped back to the control signal input port 38 of the master circuit 22, and the signal processing portion 32 processes the input data (Di) in accordance with the looped-back control signal. The processed data is output via at least one output port 39 to a corresponding data lane. It should be noted that the control signal is not input to the signal processing portion 32 directly from the control signal generator 30, but is output from the master circuit 22 and then distributed thereto via the control signal bus 26. Thus, the master circuit 22 sees the delay in the control signal caused by the process, voltage, and temperature (PVT) variations internal to the master circuit as well as external delay such as traveling the bus.

Thus, by generating all necessary control signals at the master circuit 22 and forwarding them to the slave circuit(s) 24 and to the master circuit 22 itself, all the circuits of the system are operated by the same control signal including substantially the same delay. This eliminates variations caused by using a different local clock signal in each circuit, and also eliminates most of the delay factors due to variations internal to each circuit, which are random in nature and difficult to control.

According to one embodiment of the present invention, the master circuit 22 may further include a global control signal input port 31 to receive a global control signal, as shown in FIG. 2. The control signal generator 30 generate at least one control signal based on the global control signal. In addition, the master circuit 22 and the slave circuit(s) 24 may have the identical circuit structure, i.e., the slave circuit(s) 24 may include a portion capable of generating a control signal. In such a case, however, such a portion may be disabled (or not used) so that the slave circuit(s) 24 is operated solely by the control signal supplied from the master circuit 22.

FIG. 3 schematically illustrates a multiple-circuit system 50 in accordance with an embodiment of the present invention, where the input data includes a group of parallel data, and the signal processing in each circuit involves a parallel-serial conversion. The multiple-circuit system 50 includes at least two circuits 52 (for example, N circuits as shown), one of which will be the master circuit and the remaining is at least one slave circuit. All the circuits 52 in the system may have the same circuit structure, and one circuit is selected from among the plurality of circuits 52 to be designated as the master circuit.

Each circuit 54 receives input data (Dj) and an associated local clock (TCXj) from the corresponding data source 56 ($0 \leq j \leq N$). Each circuit includes a serializer 54 to convert the group of parallel data into a group of serial data, and outputs the serial data onto M data lanes via the corresponding serial output ports ($1 \leq M$). Thus, the system 50 provides N×M serial data link connections. The multi-circuit system 50 further includes a clock source 58 to supply a common reference clock signal (Refclk) to each data source 56 and each circuit 52.

Since each circuit 52 receives a separate local clock TCXj, there will be some phase skew between these clocks due to board trace, process, voltage, temperature, and some other variations. If there is no realignment scheme, these parallel data can be latched in different cycle/byte when they are clocked into the serializer 54 by the common clock (Refclk). When such a misalignment happens, the serial data output across the multiple circuits can be off by one whole cycle.

One embodiment of the present invention provides a scheme to synchronize the serial outputs across multiple circuits/chips within a predetermined time period. The scheme includes two main parts: aligning all parallel input data across a plurality of circuits within one clock cycle; and managing the skew of the serial outputs within a predetermined time period across the multiple circuits. The synchronizing scheme is explained in detail using the following example.

FIG. 4 schematically illustrates a multiple-circuit system 60 according to a specific embodiment of the present invention, where the serializer is a quad serializer, with a detailed structure of each circuit. A typical application of this embodiment of the present invention may be a data transmission portion of a transceiver, and each circuit may be implemented in a respective core chip. However, it should be noted that the present invention is not limited to a specific application, but applicable to synchronization for any multiple-circuit system or multiple-chip system, including a multi-circuit system 50 shown in FIG. 3.

Referring to FIG. 4, the multiple-circuit system 60 includes a plurality of circuits, and one of the circuits is selected as the master circuit 62. Any circuit can be the master circuit 62. The remaining at least one circuits is at least one slave circuit 64. Each circuit of the system 60 has a synchronous parallel input port for receiving a group of parallel data and a local clock signal (TCX) associated with the group of parallel data (the data input is not shown in FIG. 4 for simplicity).

As shown in FIG. 4, the master circuit 62 includes a global control signal input port 70 to receive a global control signal RSTi (for example, Reset/enable signal), a first synchronizer 72 for clocking the global control signal (RSTi) with the local clock signal (TCXi) so as to generate a first control signal (Sync_RST). The first control signal (Sync_RST) is output from a first control signal output 74 (as a signal Sync_REST_out), and looped back to the master circuit 62 itself and forwarded to each slave circuit 64.

The master circuit 62 further includes a first control signal input 76 for receiving the first control signal looped back from the first control signal output port 74 (as a signal Sync_RST_in), a first enable signal generator 78, a data storage unit 80 (for example, a FIFO storage), a clock input port 82 to receive a common clock signal (RefClk), a second synchronizer 84, a second control signal output 86, a second control signal input 88, and a second enable signal generator 90. The first enable signal generator 78 clocks the first control signal (Sync_RST_in) with the local clock signal (TCXi) so as to produce a first enable signal (wrt_En). The parallel input data is written into the data storage unit 80 in accordance with the first enable signal (wrt_En).

In each slave circuit 64, which has the same circuit structure as the master circuit 62, the forwarded first control signal (Sync_RST_in) is received at a first control signal input 76'. A first enable signal generator 78' clocks the first control signal with the local clock signal (TCXn) so as to produce a first enable signal (wrt_En). The parallel input data is written into the data storage unit 80' in accordance with the first enable signal (wrt_En) in the same manner as that in the master circuit 62.

At the master circuit 62, the first enable signal (wrt_En) is also supplied to the second synchronizer 84, which clocks the first enable signal (wrt_En) with the common clock signal (RefClk) so as to generate a second control signal (rdEn). The second control signal is output from the second control signal output 86 (as a signal rdEn_out), and forwarded to the master circuit 62 itself and to each slave circuit 64.

At the master circuit 62, the second control signal is received at the second control signal input 88 (as the looped back signal rden_In), and the second enable signal generator 90 clocks the second control signal with the common clock signal (RefClk) so as to produce a second enable signal (Sync_rdEn). The input data written to and stored in the data storage unit 80 is read therefrom in accordance with the second enable signal (Sync_rdEn) and supplied to a serializer 92.

Similarly, in each slave circuit 64, the forwarded second control signal (rdEn_In) is received at a second control signal input 76'. A second enable signal generator 90' clocks the second control signal with the common clock signal (RefClk) received at a clock signal input port 82' so as to produce a second enable signal (Sync_rdEn). The input data written to and stored in the data storage unit 80' is read therefrom in accordance with the second enable signal (Sync_rdEn) and supplied to a serializer 92' in the same manner as that in the master circuit 62.

It should be noted that although each slave circuit 64 has the same structure as the master circuit 62, the portions for generating the control signals (such as the first and second synchronizers) in the slave circuit 64 is disabled and/or not used in operating the circuit. For example, as shown in FIG. 4, the global control signal input port 70' of the slave circuit may be grounded.

FIG. 5 illustrates timing and logic waveforms of the synchronization scheme in accordance with an embodiment of the present invention. The wave forms represent, from the top, the local clock (TCX-2) in the master circuit (generated by dividing the input local clock signal TCXi by 2), the common clock signal (Refclk), the global control signal (RSTi) input to the master circuit, the fist control signal generated in the master circuit (Sync_RST), the first control signal supplied to the master (and slave circuits) (Sync_RST_In), a initialization signal for initializing the FIFO (Clear), the first enable signal (Wrt_En) in each circuits, the second control signal generated in the master circuit (rdEn), the second control signal supplied to each circuit (rdEn_In), and the second enable signal (Sync_reEn) in each circuit. The two waveforms at the bottom represent the write operation (Write) and read operation (Read) to the FIFO.

As shown in FIG. 5, in the master circuit, the first control signal (Sync_RST) is generated at the first rising edge of the local clock signal (TCX-2) after the global control signal (RSTi) goes low. The first control signal is distributed to each circuit (master, slave) as the input control signal (Sync_RST_In) with a delay (Tdlay). Then, the first rising edge of the local clock signal (TCX-2) after the first control signal (Sync_RST_In) goes low drives the first enable signal (Wrt_En) high (a write enable flag on), which triggers the write operation in the next cycle. Similarly, at the first rising edge of the common clock signal (Refclk) after the first enable signal (Wrt_En) goes high, the second control signal (rden) is generated (goes high). The second control signal is distributed to each circuit as the second input control signal (rden_In) with a delay (Tdlay). Then, the first rising edge of the common clock signal (Refclk) after the second control signal (rden_In) goes high drives the second enable signal (Sync rden) high (a read enable pointer on), which triggers the read operation in the next cycle.

"Tdlay" denotes a delay from the control signals generated in the master circuit to the control signals supplied to each circuit: the delay from the first control signal generated in the master circuit (Sync_RST) to the first control signal supplied to each circuit (Sync_RST_In); and the delay from the second control signal generated in the master circuit (rden) to that supplied to each circuit (rdEn_In). The delay includes propagation delay of 10 buffers, all the internal cells, packages and board trace flight time. The amount of the delay due to variations internal to the master circuit is substantially identical for each circuit, as discussed above. In addition, the master circuit may be selected so as to minimize the difference in signal path lengths from the master circuit to each slave circuit and to the master circuit itself. Thus, each circuit receives the same control signals at substantially the same timing or with a minimum variation.

Since in each circuit the first enable signal is generated using the same first control signal (Sync_RST_In), and the second enable signal is generated using the same second control signal (rdEn_In), instead of generating thees control signals in each circuit, statistical and/or uncontrollable inter-circuit variations due to process, temperature, voltage, etc. are minimized.

FIG. 6 is a timing diagram illustrating an example of calculating timing budget and margin for the forwarded control signals. Generally, setup and hold margins can be calculated in the following ways.

For a setup margin,

Setup Margin=Period−2×$tsktcx$−$tsetup$−$(tinbuf)_{min}$−$(tcells+toutbuf+tpkg+tflgt+tpkg)_{max}$, where Period is the time period for one clock cycle. It should be noted that all clock signals have the same frequency. The above equation is the worst case of setup margin. Master TCX-2 clock is later than slave TCX-2 clock by maximum "tsktcx," thus master chip is in worst case corner (WNWP, 125° C., Vdd−10%) and slave chips are in best case corner (SNSP, 0° C., Vdd+10%).

For a hold margin,

Hold Margin=$(tcells+toutbuf+tpkg+tflgt+tpkg)_{min}$+$(tinbuf)_{max}$−$tsktcx$−$thold$ The above equation is the worst case of hold margin. Master TCX-2 clock is later than slave TCX-2 clock by maximum "tskcx" thus master chip is in best case corner (SNSP, 0° C., Vdd+10%) and slave chips are in worst case corner (WNWP, 125° C., Vdd−10%).

It should be noted that these numbers are used to calculate maximum margins for the control signals only, and they do not represent the timing budget and margin for the maximum lane to lane skew itself.

Once byte alignment is performed by synchronizing the control signals, as described above, skew at the serial outputs can be controlled to certain range. From the output of the FIFO to the serial output at the pin level, there are several parts that contribute to the total skew. Placement error of the common clock signal (Refclk) or skew of the common clock signal (Refclk) at the serializer's multiplexer level between all the data lanes is one contributor. This skew can depend on process, voltage, and temperature (PVT) variation of insertion delay of all the cells on the clock path and clock generation scheme. Package skew and PVT variation of insertion delay of all the cells on the data path will also contribute to the total data skew.

FIG. 7 shows a table containing break-down parameters of the contributors described above, in the case where each circuit is implemented as a serializer-deserializer (SerDes) chip with the timing budget of maximum 500 ps. These parameters, however, can be grouped differently or broken down further depending on the clocking and serialization scheme used, and the specific numbers are used for illustrative purpose only, and by no means limit the present invention.

FIG. 8 is a process flow diagram illustrating a method for synchronizing a multiple-circuit system in accordance with an embodiment of the present invention. The system may be a multiple circuit system 20, or system 50, as described above.

First, a master circuit is selected from a plurality of circuits, the remaining circuits being at least one slave circuit (100). At least one control signal is generated at the master circuit using the local clock signal of the master circuit (110). The control signal(s) is forwarded to each slave circuit (120), and at the same time looped back to the master circuit (130). The master circuit is operated using the looped-back control signal(s) (140), and the slave circuit(s) are operated using the forwarded control signal(s) (150). By property selecting parameters, operation timings of the circuits (master circuit and at least one slave circuit) are aligned within one clock cycle. The data processed by the operation is output (160), and skew across the circuits is controlled to be within a predetermined time period (170).

FIG. 9 is a process flow diagram illustrating a method for synchronizing a multiple-circuit system in accordance with an embodiment of the present invention. The system may be a multiple circuit system 60 as described above.

First, a master circuit is selected from a plurality of circuits, the remaining circuits being at least one slave circuit (200). A global control signal is received at the master circuit (202), and a first control signal is generated by clocking the global control signal with the local clock signal of the master circuit (204). The first control signal is output from the master circuit and distributed to each circuit of the system. That is, the first control signal is looped back to the master circuit (206) and forwarded to the slave circuit(s) (208).

At the master circuit, the distributed first control signal is clocked with the local clock signal (210) so as to produce a first enable signal (212). A first operation is performed onto the input data in accordance with the first enable signal (214). Similarly, at the slave circuit(s), the forwarded first control signal is clocked with the local clock signal (216) so as to produce a first enable signal (218). A first operation is performed onto the input data in accordance with the first enable signal (220). The first operation may be writing the data into a FIFO.

A common clock is received at the master circuit (222), and a second control signal is generated using the first enable signal and the common clock signal (224). The second control signal is looped back to the master circuit (226) and also forwarded to the slave circuit(s) (228).

At the master circuit, the looped-back second control signal is clocked with the common clock signal (230) so as to produce a second enable signal (232). A second operation is performed onto the input data in accordance with the second enable signal (234). Similarly, at the slave circuit(s), the forwarded second control signal is clocked with the common clock signal (236) so as to produce a second enable signal (238). A second operation is performed onto the input data in accordance with the second enable signal (240) in the same manner as in the master circuit. The second operation may be reading the data from the FIFO.

As described above, the multi-circuits synchronization scheme according to an embodiment of the present invention uses a master circuit and slave circuit(s). One of the circuits can be used as a master circuit which receives the global control signal. The master circuit generates all necessary control signals using its own local clocks, and the control signals are forwarded to all of the slave circuits. By doing this, all slave circuits receive the same control signals referencing to the local clocks of the master circuit thus eliminating multiple clock domains. Furthermore, the control signals are also looped back to the master circuit itself. By receiving its own control signals, the master circuit can also be seen as one of the slave circuits when it comes to calculating the timing budget.

By using this synchronizing technique of the present invention, the tasks of byte aligning and skew managing across multiple circuits/chips are significantly simplified. As described and shown in the above embodiments, once the bite alignment for input data is accomplished, there is a great flexibility of choosing types of cells, IO buffer, as well as internal cells to manage skew across the circuits. Chips placement and board routing also become less challenging. The synchronization scheme is also independent of process technology used and numbers of chips or lanes need to be synchronized.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for synchronizing a multiple-circuit system, said system including a plurality of circuits, each circuit having a synchronous input port for receiving input data and a local clock signal associated with the input data, a signal processing portion, and at least one output port for outputting processed data, said method comprising:
   selecting a master circuit from said plurality of circuits, the remaining circuits including at least one slave circuit;
   generating at least one control signal at said master circuit using the local clock signal of said master circuit;
   outputting said at least one control signal from said master circuit;
   forwarding said at least one control signal to said at least one slave circuit;
   looping back said at least one control signal to said master circuit;
   operating said at least one slave circuit using said forwarded control signal; and
   operating said master circuit using said looped-back control signal, timings of said operating said at least one slave circuit and said operating said master circuit being aligned within one clock cycle of said local clock signal.

2. A method according to claim 1, wherein said generating at least one control signal includes:
   supplying a global control signal to said master circuit; and
   generating a first control signal using said global control signal and said local clock signal.

3. A method according to claim 2, wherein said forwarding includes:
   forwarding said first control signal to said at least one slave circuit, and wherein said operating said at least one slave circuit includes:
   clocking said forwarded first control signal with the local clock signal of said slave circuit so as to produce a first enable signal; and
   performing a first operation onto the input data in accordance with said first enable signal at each of said at least one slave circuit.

4. A method according to claim 3, wherein said first enable signal includes a write enable signal.

5. A method according to claim 3, wherein said looping back includes:
   looping back said first control signal to said master circuit, and wherein said operating said master circuit includes:
   clocking said looped-back first control signal with the local clock signal of said master circuit so as to produce a first enable signal; and
   performing a first operation onto the input data in accordance with said first enable signal at said master circuit.

6. A method according to claim 5, wherein said first enable signal includes a write enable signal.

7. A method according to claim 5, further comprising:
   supplying a common clock signal to each of said plurality of circuits, wherein said generating at least one control signal further includes:
   generating, at said master circuit, a second control signal using said first enable signal of said master circuit and said common clock signal.

8. A method according to claim 7, wherein said forwarding includes:
   forwarding said second control signal to said at least one slave circuit, and wherein said operating said at least one slave circuit further includes:
   clocking said forwarded second control signal with said common clock signal so as to produce a second enable signal; and
   performing a second operation onto the input data in accordance with said second enable signal at each of said at least one slave circuit.

9. A method according to claim 8, wherein said second enable signal includes a read enable signal.

10. A method according to claim 8, wherein said looping back includes:
    looping back said second control signal to said master circuit, and wherein said operating said master circuit further includes:
    clocking said looped-back second control signal with said common clock signal so as to generate a second enable signal; and
    performing a second operation onto the input data in accordance with said second enable signal at said master circuit.

11. A method according to claim 10, wherein timings of said second operation at said at least one slave circuit and said second operation at said master circuit are aligned within one clock cycle of said common clock signal.

12. A method according to claim 10, wherein said second enable signal includes a read enable signal.

13. A method according to claim 1, wherein said input data includes a group of parallel data, said method further comprising:
    converting said group of parallel data into a group of serial data at each of said plurality of circuits; and
    outputting said group of serial data from a second plurality of serial output ports of each of the plurality of circuits.

14. A method according to claim 13, further comprising:
    controlling skew in said group of serial data across said plurality of circuits within a predetermined time period.

15. A method for operating a multiple-circuit system, said system including a plurality of circuits, said method comprising:
    selecting a master circuit from said plurality of circuits, the remaining circuits including at least one slave circuit;
    receiving, at each of said plurality of circuits, input data and a local clock signal associated with the input data;
    generating at least one control signal at said master circuit using the local clock signal of said master circuit;
    outputting said at least one control signal from said master circuit;
    forwarding said at least one control signal to said at least one slave circuit;

looping back said at least one control signal to said master circuit;
processing the input data at said at least one slave circuit using said forwarded control signal;
processing the input data at said master circuit using said looped-back control signal; and
outputting the processed data from each of said plurality of circuits.

16. A method according to claim 15, wherein timings of said processing the input data at said at least one slave circuit and said processing the input data at said master circuit are aligned within one clock cycle of said local clock signal.

17. A method according to claim 15, further comprising: controlling skew in said processed data across said plurality of circuits within a predetermined time period.

18. A method according to claim 15, wherein said input data includes a group of parallel data, said method comprising:
converting said group of parallel data into a group of serial data at each of said plurality of circuits; and
outputting said group of serial data from a second plurality of serial output ports of each of the plurality of circuits.

19. A method according to claim 18, further comprising: controlling skew in said group of serial data across said plurality of circuits within a predetermined time period.

20. A method for synchronizing a multiple-circuit system including a first plurality of circuits, each circuit having a synchronous parallel input port for receiving a group of parallel data and a local clock signal associated with said group of parallel data, a second plurality of serial output ports, and a clock input port for receiving a common clock signal, said method comprising:
selecting a master circuit from said first plurality of circuits;
receiving at the mater circuit a global control signal;
generating a first control signal by clocking the global control signal with the local clock signal of the master circuit;
outputting said first control signal from said master circuit;
distributing said first control signal to each of said at least one slave circuit and to the master circuit;
clocking, at each of said at least one slave circuit and said master circuit, said distributed first control signal with the local clock signal of said each circuit so as to produce a write enable signal in said each circuit;
writing, at said each circuit, said group of parallel data into a FIFO buffer in accordance with said write enable signal;
generating, at said master circuit, a second control signal by clocking said write enable signal thereof with the common clock signal;
outputting said second control signal from said master circuit;
distributing said second control signal to each of said at least one slave circuit and to said master circuit;
clocking, at each of said at least one slave circuit and the master circuit, said distributed second control signal with the common clock signal so as to produce a read enable signal in said each circuit;
reading, at said each circuit, data from the FIFO buffer of said each circuit in accordance with said read enable signal so as to convert the group of parallel data into a group of serial data; and
outputting said group of serial data from said second plurality of serial output ports of said each circuit.

21. A method according to claim 20, wherein timings of said reading at said each circuit are aligned within one clock cycle of said common clock signal.

22. A method according to claim 20, further comprising: controlling skew in said group of serial data across said first plurality of circuits within a predetermined time period.

23. A multiple-circuit system, comprising:
a master circuit, including:
a synchronous input port to receive input data and a local clock signal associated with the input data;
a control signal generator to generate at least one control signal using the local clock signal;
a control signal output port to output said at least one control signal;
a control signal input port to receive said at least one control signal looped back from said control signal output port;
a signal processing portion to process the input data in accordance with said at least one looped-back control signal; and
at least one output port for outputting the processed data;
at least one slave circuit, each of said at least one slave circuit including:
a synchronous input port for receiving input data and a local clock signal associated with the input data;
a control signal input port to receive said at least one control signal from said master circuit;
a signal processing portion to process the input data in accordance with said at least one control signal; and
at least one output port for outputting the processed data; and
a control signal bus coupled from said control signal output port of said master circuit to each control signal input port of said at least one slave circuit and to the control signal input port of said master circuit.

24. A multiple-circuit system according to claim 23, wherein said master circuit further includes:
a global control signal input port to receive a global control signal, and wherein said control signal generator includes:
a first synchronizer to clock the global control signal with the local clock signal so as to generate a first control signal.

25. A multiple-circuit system according to claim 23, wherein said signal processing portion of said at least one slave circuit includes:
a first enable signal generator to clock the first control signal with the local clock signal so as to produce a first enable signal; and
a first operator to perform a first operation onto the input data in accordance with the first enable signal.

26. A multiple-circuit system according to claim 25, wherein said first enable signal includes a write enable signal.

27. A multiple-circuit system according to claim 25, wherein said signal processing portion of said master circuit includes:
a first enable signal generator to clock the first control signal with the local clock signal so as to produce a first enable signal; and
a first operator to perform a first operation onto the input data in accordance with the first enable signal.

28. A multiple-circuit system according to claim 27, wherein said first enable signal includes a write enable signal.

29. A multiple-circuit system according to claim 27, wherein said master circuit further includes:
  a clock input port to receive a common clock signal, and wherein said control signal generator further includes:
  a second synchronizer to clock said first enable signal with said common clock signal so as to generate a second control signal.

30. A multiple-circuit system according to claim 29, wherein said at least one slave circuit further includes:
  a clock input port to receive said common clock signal, and wherein said signal processing portion of said at least one slave circuit further includes:
  a second enable signal generator to clock said second control signal with the common clock signal so as to produce a second enable signal; and
  a second operator to perform a second operation onto the input data in accordance with the second enable signal.

31. A multiple-circuit system according to claim 30, wherein said second enable signal includes a read enable signal.

32. A multiple-circuit system according to claim 30, wherein said signal processing portion of said master circuit further includes:
  a second enable signal generator to clock said second control signal with the common clock signal so as to produce a second enable signal; and
  a second operator to perform a second operation onto the input data in accordance with the second enable signal.

33. A multiple-circuit system according to claim 32, wherein said second enable signal includes a read enable signal.

34. A multiple-circuit system according to claim 23, wherein said input data includes a group of parallel data, and wherein each of said master circuit and said at least one slave circuit includes:
  a serializer to convert the group of parallel data into a group of serial data; and
  a plurality of serial output ports to output the group of serial data.

35. An apparatus for synchronizing a multiple-circuit system, said system including a plurality of circuits, said apparatus comprising:
  means for selecting a master circuit from said plurality of circuits, the remaining circuits including at least one slave circuit;
  means for receiving, at each of said plurality of circuits, input data and a local clock signal associated with the input data;
  means for generating at least one control signal at said master circuit using the local clock signal of said master circuit;
  means for outputting said at least one control signal from said master circuit;
  means for forwarding said at least one control signal to said at least one slave circuit;
  means for looping back said at least one control signal to said master circuit;
  means for processing the input data at said at least one slave circuit using said forwarded control signal;
  means for processing the input data at said master circuit using said looped-back control signal; and
  means for outputting the processed data from each of said plurality of circuits.

36. An apparatus according to claim 35, wherein timings of said processing the input data at said at least one slave circuit and said processing the input data at said master circuit are aligned within one clock cycle of said local clock signal.

37. An apparatus according to claim 35, wherein said input data includes a group of parallel data, and said means for processing includes:
  means for converting said group of parallel data into a group of serial data at each of said plurality of circuits.

38. An apparatus according to claim 37, wherein skew in said group of serial data across said plurality of circuits are within a predetermined time period.

39. An apparatus according to claim 35, wherein said means for generating at least one control signal includes:
  means for supplying a global control signal to said master circuit;
  means for clocking said global control signal with said local clock signal; and
  means for generating a first control signal using said clocked global control signal.

40. An apparatus according to claim 39, wherein said means for forwarding includes:
  means for forwarding said first control signal to said at least one slave circuits, and wherein said means for processing the input data at said at least one slave circuit includes:
  means for clocking said forwarded first control signal with the local clock signal of said slave circuit so as to produce a first enable signal; and
  means for performing a first operation onto the input data in accordance with said first enable signal.

41. An apparatus according to claim 40, wherein said first enable signal includes a write enable signal.

42. An apparatus according to claim 40, wherein said means for looping back includes:
  means for looping back said first control signal to said master circuit, and wherein said means for processing the input data at said master circuit includes:
  means for clocking said looped-back first control signal with the local clock signal of said master circuit so as to produce a first enable signal; and
  means for performing a first operation onto the input data in accordance with said first enable signal at said master circuit.

43. An apparatus according to claim 42, wherein said first enable signal includes a write enable signal.

44. An apparatus according to claim 42, further comprising:
  means for receiving a common clock signal at each of said plurality of circuits, wherein said means for generating at least one control signal further includes:
  means for generating a second control signal using said first enable signal of said master circuit and said common clock signal.

45. An apparatus according to claim 44, wherein said means for forwarding includes:
  means for forwarding said second control signal to said at least one slave circuits, and wherein said means for processing the input data at said at least one slave circuit further includes:
  means for clocking said forwarded second control signal with said common clock signal so as to produce a second enable signal; and
  means for performing a second operation onto the input data in accordance with said second enable signal at said each slave circuit.

46. An apparatus according to claim 45, wherein said second enable signal includes a read enable signal.

47. An apparatus according to claim 45, wherein said means for looping back includes:
  means for looping back said second control signal to said master circuit, and wherein said means for processing the input data at said master circuit further includes:
  means for clocking, at said master circuit, said looped-back second control signal with said common clock signal so as to generate a second enable signal; and
  means for performing a second operation onto the input data in accordance with said second enable signal at said master circuit.

48. An apparatus according to claim 47, wherein timings of said second operation at said at least one slave circuit and said second operation at said master circuit are aligned within one clock cycle of said common clock signal.

49. An apparatus according to claim 47, wherein said second enable signal includes a read enable signal.

50. A method for synchronizing a multiple-circuit system including a first plurality of circuits, each circuit having a synchronous parallel input port for receiving a group of parallel data and a local clock signal associated with said group of parallel data, a second plurality of serial output ports, and a clock input port for receiving a common clock signal, said method comprising:
  selecting a master circuit from said first plurality of circuits;
  receiving at the master circuit a global control signal (RSTi: Reset signal);
  generating a first control signal (Sync_RST_out) by clocking the global control signal with the local clock signal (TCXi) of the master circuit;
  outputting said first control signal from said master circuit;
  distributing said first control signal to each of said at least one slave circuit and to the master circuit;
  clocking, at each of said at least one slave circuit and said master circuit, said distributed first control signal (Sync_RST_in) with the local clock signal (TCXn) of said each circuit so as to produce a write enable signal (wr_En) in said each circuit;
  writing, at said each circuit, said group of parallel data into a FIFO buffer in accordance with said write enable signal;
  generating, at said master circuit, a second control signal (rdEn_out) by clocking said write enable signal thereof with the common clock signal (RefClk);
  outputting said second control signal from said master circuit;
  distributing said second control signal to each of said at least one slave circuit and to said master circuit;
  clocking, at each of said at least one slave circuit and the master circuit, said distributed second control signal (rdEn_in) with the common clock signal so as to produce a read enable signal (Sync_rdEn) in said each circuit;
  reading, at said each circuit, data from the FIFO buffer of said each circuit in accordance with said read enable signal so as to convert the group of parallel data into a group of serial data; and
  outputting said group of serial data from said second plurality of serial output ports of said each circuit.

* * * * *